Figure 1:
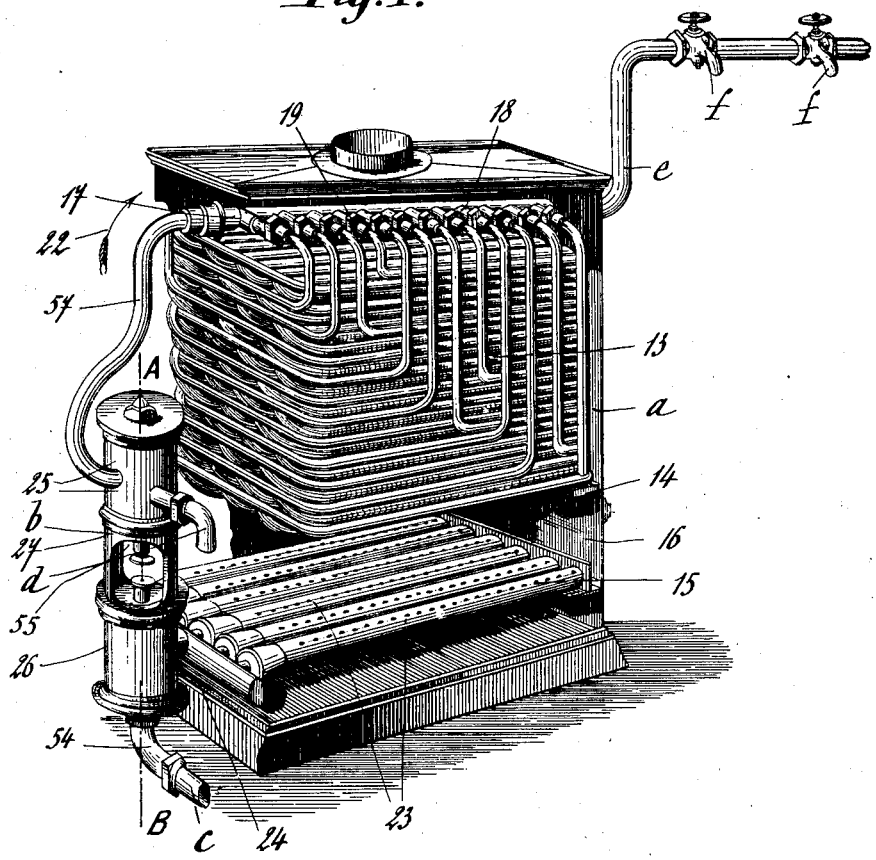

No. 826,468. PATENTED JULY 17, 1906.
E. BOULBOULLÉ.
HOT WATER DISTRIBUTING APPARATUS.
APPLICATION FILED SEPT. 15, 1904.

4 SHEETS—SHEET 1.

No. 826,468. PATENTED JULY 17, 1906.
E. BOULBOULLÉ.
HOT WATER DISTRIBUTING APPARATUS.
APPLICATION FILED SEPT. 15, 1904.
4 SHEETS—SHEET 2.
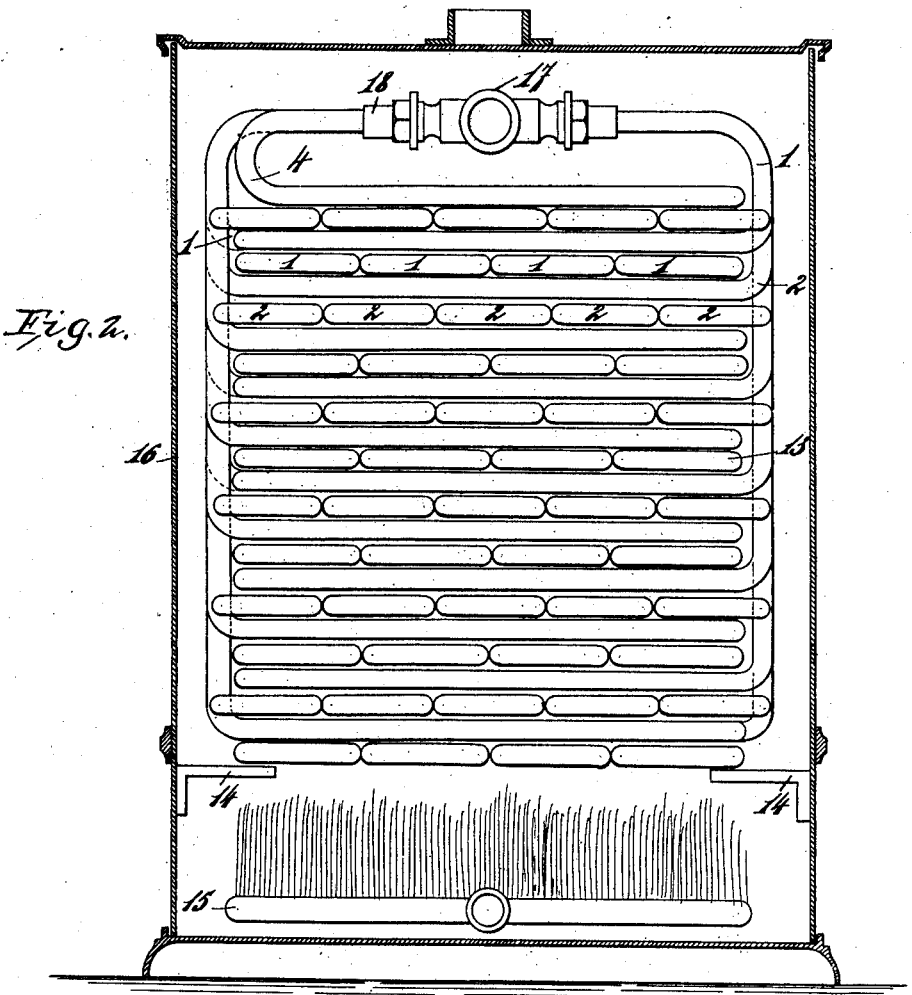
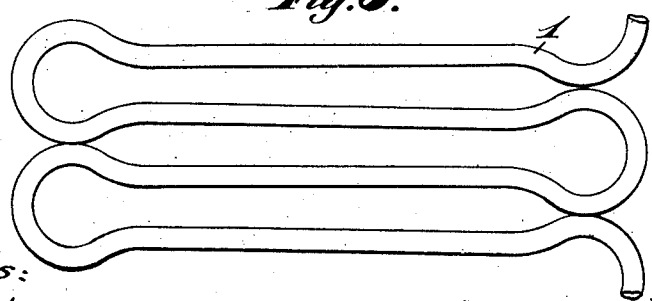

No. 826,468. PATENTED JULY 17, 1906.
E. BOULBOULLE.
HOT WATER DISTRIBUTING APPARATUS.
APPLICATION FILED SEPT. 15, 1904.
4 SHEETS—SHEET 3.
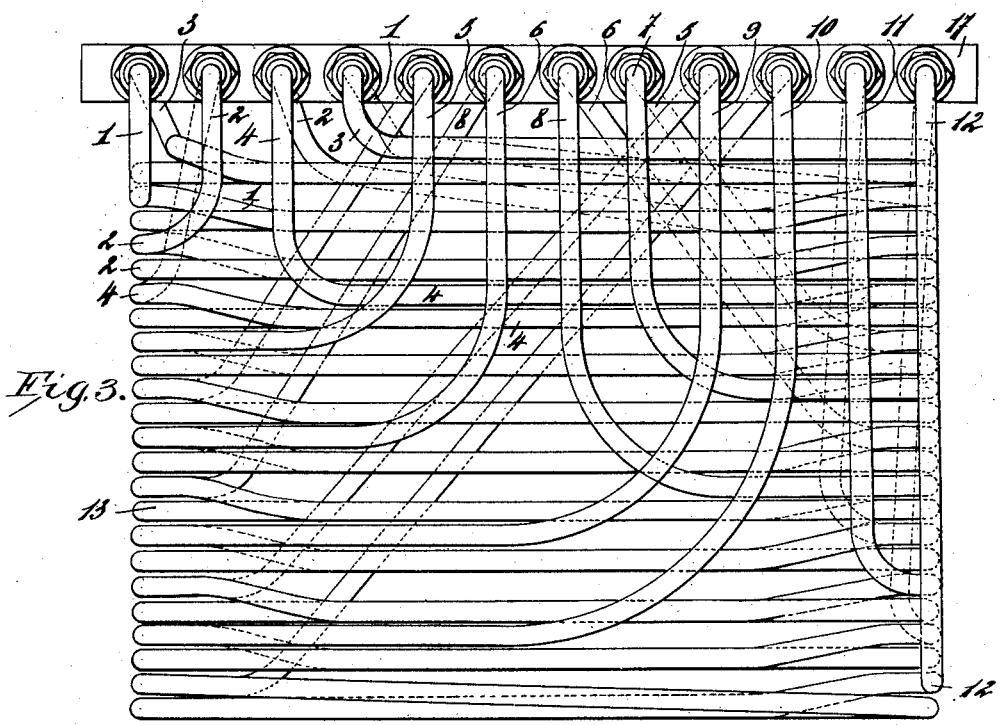
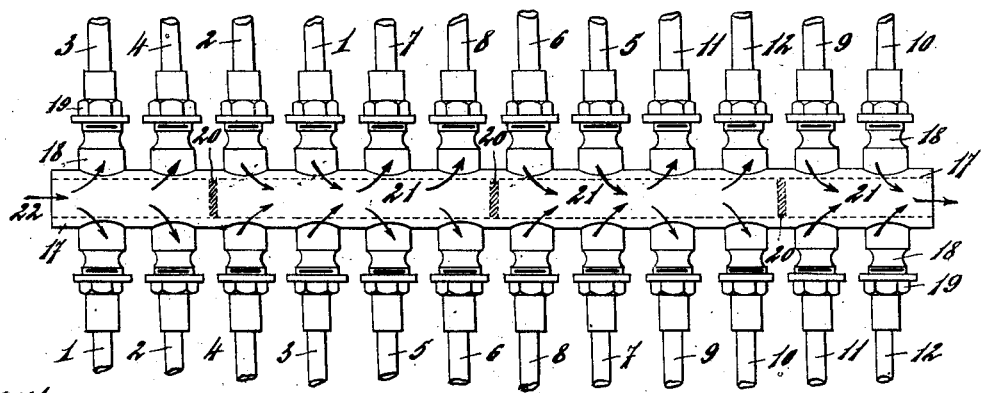
Witnesses:
Waldo M. Chapin
Randall H. Trumpy
Inventor
Ernest Boulboulle
by his atty.
Rosenbaum & Stockbridge

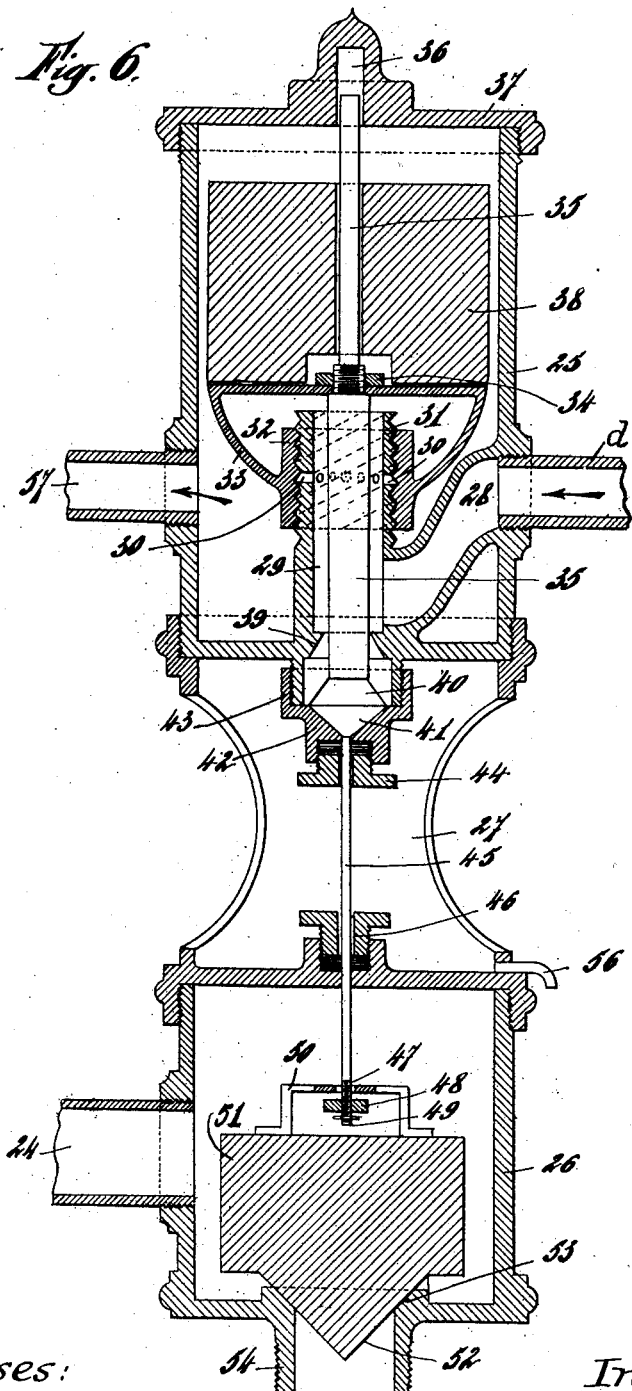

UNITED STATES PATENT OFFICE.

ERNEST BOULBOULLÉ, OF BRUSSELS, BELGIUM, ASSIGNOR TO THE FIRM OF G. WIDMER & CIE, OF HAREN, NEAR BRUSSELS, BELGIUM.

HOT-WATER-DISTRIBUTING APPARATUS.

No. 826,468.      Specification of Letters Patent.      Patented July 17, 1906.

Application filed September 15, 1904. Serial No. 224,511.

*To all whom it may concern:*

Be it known that I, ERNEST BOULBOULLÉ, a subject of the Queen of the Netherlands, residing at Brussels, in the Kingdom of Belgium, have invented new and useful Improvements in Hot-Water-Distributing Apparatus, of which the following is a specification.

This invention relates to heating and hot-water circulating or distributing apparatus of the class in which by simply opening a hot-water cock in a pipe the supply and regulation of heating-water to the heating apparatus is determined, as well as the action of the apparatus.

The invention consists more particularly in the combination, with a special heating device, of an automatic valve adapted to simultaneously control the water-supply to said heating apparatus and the supply of gas necessary for heating said apparatus.

The invention also relates to details of construction and to the combination of the different parts, as will be hereinafter described, and pointed out in the claims.

Reference is made to the annexed drawings, in which—

Figure 1 is a perspective view of the complete apparatus, part of the casing of the heating device being broken away to more clearly show the interior thereof. Fig. 2 shows the outer casing of the heating apparatus in section and the inner part thereof in elevation. Fig. 3 is a side view showing the tubes or coils for heating the water, said tubes being removed from the casing of the apparatus. Fig. 4 is a plan view of a constructional detail of the heating apparatus. Fig. 5 is a detail view showing the shape of one of the tubes of the heating apparatus. Fig. 6 is a vertical section on the line A B of Fig. 1 of the controlling-valve used in conjunction with the heating apparatus.

As shown in Fig. 1, the complete apparatus comprises the heating device $a$, combined with the automatic valve or controlling apparatus $b$. The said valve is connected, by means of a pipe $c$, to a gas-feed pipe and by a second pipe $d$ to a main supplying water under pressure.

The heating apparatus $a$ is connected to a distributing-pipe $e$, in which may be inserted, for instance, hot-water-distributing cocks $f$, and the action of the whole device is such that it is sufficient to open one of the cocks $f$, causing the valve $b$ to automatically effect at a distance the regulation of the water and gas supply through the pipes $d$ and $c$, respectively, the apparatus thus automatically feeding the desired quantity of hot water and the heating of the water being produced at the required moment by the automatic putting in action of a gas-burner with which the apparatus $a$ is provided and to which the gas is supplied by the pipe $c$, controlled by the valve $b$.

The heating apparatus $a$ consists of a plurality of coils the ends of which are numbered from 1 to 12. (See particularly Fig. 4.) These coils are superposed in such a manner as to form a body 13 of rectangular or any other convenient shape, said body being supported by brackets or supports 14 above a gas-burner 15, for instance, and the whole device is inclosed in an outer casing 16, as shown in Fig. 2.

The ends of the various coils all terminate at the upper part of the apparatus in the same horizontal plane and are connected to each other by a chest 17, having, for instance, lateral connecting-spigots 18, to which the tubes are connected by means of unions 19, so as to give a tight joint without brazing or soldering being necessary. The chest 17 is divided at several points—between the lateral connections 18, for instance—by means of partitions 20, Fig. 4, so that it is divided into a certain number of chambers 21 in communication with the different coils. The position of said partitions 20 can be chosen according to requirements and to the groups of coils to be made. Each chamber 21 is provided with, for instance, four tubes 18, so as to permit communication between any two given coils and two other coils. In the form of construction illustrated the partitions are placed so as to group the coils in sets of four, each chamber having eight connecting-tubes, four of which receive the inlet ends of four coils and the remainder the outlet ends of the four following coils.

The water to be heated passes to the chest 17 in the direction of the arrow 22, Figs. 1 and 4. It thus passes into the first chamber 21, whence it passes simultaneously through the first four coils 1, 2, 3, and 4, the ends of which are connected to four connecting-tubes of the second chamber 21. The liquid when leaving these coils then passes into the coils 5, 6, 7, and 8 of the second group, these latter coils terminating in the third chamber 21, which establishes communication between said coils, and the last group consisting of the four coils 9, 10, 11, and 12. The heated water then passes to the place where it is to be used through the outlet end of the union 17, which is in communication with the distributing-pipe e. (Shown in Fig. 1.)

From inspection of the drawings it will be easily understood that the first group of coils 1, 2, 3, and 4 are those which form the upper part of the body 13, whereas the following groups form the successively-descending parts thereof, so that an absolutely systematic circulation is obtained, the coldest water circulating first in the coils which are farthest from the source of heat 15 and arriving by degrees nearer and nearer to said source as it becomes more heated.

The division or partition of the union 17 can obviously be arranged as desired and can be chosen according to the capacity and production of the apparatus.

The burner 15 can be of any suitable construction. It may, for instance, be constructed as shown in Fig. 1 and comprise a number of parallel burner-tubes 23, branched from the gas-supply pipe 24 in communication with the valve b. As shown in Fig. 6, the said valve comprises a box or casing 25, containing the water-distributing device, a second independent box or casing 26, containing the gas-valve, and an intermediate part 27, adapted to connect the two aforesaid boxes 25 and 26.

The box 25 is connected on one hand to the water-supply pipe d and on the other hand to the pipe 57, which is connected to the entrance of tube 17, Fig. 1. The supply-pipe d communicates with an inner tubing 28, leading in the box 25 to a vertical conduit 29, having a certain number of bores or orifices 30. The tube forming the vertical conduit 29 carries at its outer surface a screw-thread 31, on which is screwed a cylindrical valve-sleeve 32, which is integral with a cap 33, which is fixed, by means of a nut 34, on a rod 35, going through the whole length of the apparatus, and guided at its upper end in a recess 36 in the cover 37, closing the box 25.

On the cap 33 lies a weight 38, which is arranged concentrically to the rod 35, and its action is sufficient to maintain normally the cap 33 in the lowest position—that is to say, with the sleeve 32 screwed entirely onto the screw of the tube 29. The bottom of the box 25 is provided in the prolongation of the central tube 29 with an opening 39, which forms a conical seat against which a cone 40 on the rod 35 can adapt itself. Said rod carries, on the other hand, a cone 41, adapted to seat, as shown in the drawings, on the conical seating 42 at the inner part of a cap 43, which contains a stuffing-box 44 to form a tight closure round the prolongation 45 of the rod 35. Said prolongation 45 enters the box 26, passing through a stuffing-box 46, and ends in the inner part of the box 26, with a screw-tapped end 47 receiving a nut 48, which is held by a pin 49. This nut 48 abuts under a strap 50, which is fixed to the gas-valve 51, the latter being formed as a weight and resting with its conical part 52 on the seat 53, formed in the bottom of the box 26 by the gas-supply orifice 54, which is connected to the pipe c. The orifice 54 is thus normally closed by the valve 51, which intercepts in this position the gas-passage of the supply-tube c to the pipe 24, which is connected to the burners 23, Fig. 1. The intermediate part 27 is advantageously provided with two holes 55, so that the glands of the stuffing-boxes 44 and 46 can be reached.

The function of the described apparatus can easily be understood.

If the apparatus is connected by the pipes d and c to the water and gas conduits, the box 25 and the body 13 of the heating apparatus are filled with water left from a prior action. As long as all the cocks f of the hot-water distribution are maintained closed the water-pressure in the box 25 is uniform—that is to say, that the water contained in the box is like the water supplied by the pipe d in the cap 33 under the normal pressure of the water-supply. These two pressures act on the one hand on the upper surface of the weight 38 and on the other hand on the inner surface of the cap 33 and maintain equilibrium, so that the different parts are maintained in the position shown in Fig. 6 under the action of the load of both the weights 38 and 51. The sleeve 32 then occupies its lowermost position on the screw-threaded part 31 of the tube 29, the conical valve 41 rests on the seat 42, and the gas-valve 51 closes the orifice of the gas-supply conduit 54. When one of the hot-water-distribution cocks f is opened, the water emptied from the heating apparatus causes a depression in the box 25 on the weight 38. The result thereof is that the pressure of the water-supply exercises action only in the inner part of the cap 33. The cap is consequently raised under the action of said pressure and displaces itself along the worm 31, which is of steep pitch. This ascensional movement combined with a partial revolution of the cap 33 raises the rod 35. The latter lifts the gas-valve 51 by means of the nut 48. This ascending movement continues until the socket 32 having passed over the orifices 30 the water from the pipe d penetrates into the box 25 and escapes through the pipe 57, passing to the tube 17 of the heating apparatus. At this moment the conical part 40 of the rod 35 arrives on the conical seat 39 and relieves the stuffing-box 44 from the action of the water-pressure. Simultaneously the valve 51 having risen the gas supplied by pipe 54 has passed through the pipe 24 to the burner 23 of the heating apparatus, where it has been lighted in contact with a suitable pilot-light. (Not illustrated.) The heating apparatus has consequently commenced its action. This function continues as long as the water-distributing cock is open. If this cock is closed, the pressure-water continues to arrive through the feed-tube $d$ until the whole apparatus is filled with water and pressure again exists above the weight 38. At this moment the equilibrium of pressure reëstablishes itself in such a manner that the action of the load of the weights 38 and 51 is no longer counterbalanced. This action of the load is sufficient to cause the sleeve 32 to redescend along the screw-thread 31. This sleeve then closes the orifices 30, while the gas-valve 51 returns to its seat 53, closing thus the gas-supply, and the valve 41 arrives again on its seat 42, preventing thus all water escape past the stuffing-box 44. Thus any penetration of water into the gas-pipe is prevented in an accurate manner, both the chambers 25 and 26 of the apparatus being completely separated. If we admit even that an oozing or unimportant escape of water might take place at the stuffing-box 44, said water would not penetrate into the box 26. It could only fall on the cover of box 26, whence it would escape through a small egress-tube 56. On the other hand, such escape could only occur in exceptional cases looking to the action of the sleeve, the stuffing-box 44 and the double valve 40 41 protecting said stuffing-box. The action is particularly accurate, no spring or other delicate part helping said function, which is only caused by the action of the water-pressure and by the action of the load resulting from the weights 38 and 51. These weights allow of regulating the apparatus for any water-pressure according to desire. The action is, moreover, insured whatever be the quantity of water taken at the distribution-cock.

Having now particularly described and ascertained the nature of my said invention and in what manner the same is to be performed, I declare that what I claim is—

1. In a hot-water-distributing apparatus, in combination, a tube provided in the inner part with partitions and forming separate chambers, connecting-tubes connected with each of said chambers, coils fixed to said connections and connecting the different chambers successively to each other, said coils being superposed and crossed in layers so as to obtain a methodical circulation, gas-burners heating said coils, water-operated valves controlling simultaneously the water-supply to the said coils through the partitioned tube and also the gas-supply to the heating-burners, and hot-water-distribution cocks, the opening and closing of which determine the action of the controlling-valves, the whole substantially as described and for the purpose set forth.

2. In an apparatus for hot-water distribution, in combination, a tube provided in the inner part with partitions and forming separate chambers, connecting-tubes ending in each of said chambers, coils fixed to said connections and causing the different chambers to communicate successively with each other, said coils being superposed and crossed in layers so as to obtain a methodical circulation, gas-burners heating said coils, a valved device consisting of two independent chambers, a water-distributing device situated in one of said chambers, a gas-valve situated in the other chamber, and a rod uniting the water-distributing device to the gas-valve, a hot-water-distributing conduit connected to the tube having partitions, and hot-water-supply cocks branching from said conduit, the opening of said cocks causing simultaneously the opening of the gas-valve and a valve of the water-distributing device, the whole substantially as described, and for the purpose set forth.

3. In an apparatus for hot-water distribution, in combination a heating apparatus comprising a plurality of coils communicating with each other in groups, gas-burners heating said coils, a valved device having two independent chambers, an intermediate part connecting said two chambers, a pressure-water-supply pipe to the upper chamber, a connecting-tube between said upper chamber and the coils, an inner tube extending vertically in the upper chamber and connected to the pressure-water-supply pipe, a quick thread-screw arranged on the said inner tube, said tube being provided with openings for the passage of water, a sleeve adapted to be moved on the said screw, a cap integral with said sleeve, a weight bearing on said sleeve, a rod connected to said cap and passing through the bottom of the upper chamber, a suitable stuffing-box round said rod, a gas-supply tube ending in the lower chamber, a valve for closing said gas-supply tube, said valve being suspended from the rod from the upper chamber, a tube connecting the lower chamber to the gas-burners, a conduit for hot-water distribution connected to the coils, and hot-water-supply cocks branching from said conduit, the whole acting substantially as described and for the purpose set forth.

4. In a hot-water-distributing apparatus, in combination, a heating apparatus provided with gas-burners, an automatic valved device regulating the water-supply to said apparatus and the gas-supply to the gas-burners, said valved device comprising two independent chambers, an intermediate body uniting both said chambers, an automatic water-distributing device situated in the upper chamber of the valve, a gas-valve situated in the lower chamber of the valve, a rod connecting the water-distributing device to said gas-valve, stuffing-boxes round said rod, a conical seat in the bottom of the upper chamber, a cap forming a tight closure round the rod connecting the water-distributing device and the gas-valve, a conical seat formed in said cap and two cones formed on the rod connecting the water-distributing device and the gas-valve said cones being adapted to rest alternately on each of the conical seats to relieve the stuffing-box from the water-pressure, substantially as described.

In testimony whereof I have signed my name to this specification in the presence of two subscribing witnesses.

ERNEST BOULBOULLÉ.

Witnesses:
GREGORY PHELAN,
MAURICE GERBEAULT.